(12) United States Patent
Malik

(10) Patent No.: US 11,837,888 B2
(45) Date of Patent: Dec. 5, 2023

(54) SYSTEMS AND METHODS FOR A LOW POWER MODE IN VEHICLE GATEWAYS

(71) Applicant: Hilti Aktiengesellschaft, Schaan (LI)

(72) Inventor: Muhammad Salman Malik, Augsburg (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days.

(21) Appl. No.: 17/692,813

(22) Filed: Mar. 11, 2022

(65) Prior Publication Data

US 2023/0291210 A1 Sep. 14, 2023

(51) Int. Cl.
| | |
|---|---|
| H02J 7/34 | (2006.01) |
| G06Q 10/08 | (2023.01) |
| H04W 4/029 | (2018.01) |
| H04W 4/40 | (2018.01) |
| H02J 7/00 | (2006.01) |
| H04W 52/02 | (2009.01) |
| H04W 4/44 | (2018.01) |

(52) U.S. Cl.
CPC .......... *H02J 7/00034* (2020.01); *G06Q 10/08* (2013.01); *H02J 7/0032* (2013.01); *H02J 7/342* (2020.01); *H04W 4/029* (2018.02); *H04W 4/44* (2018.02); *H04W 52/0206* (2013.01)

(58) Field of Classification Search
CPC .......... G06Q 10/08; H02J 7/342; H04W 4/02; H04W 4/021; H04W 4/025; H04W 4/029; H04W 4/40; H04W 4/44; H04W 4/48; H04W 4/80; H04W 12/47; H04W 24/10; H04W 52/0261; H04W 52/0274; H04W 52/0277; H04W 52/029; H04W 52/0293
See application file for complete search history.

(56) References Cited

U.S. PATENT DOCUMENTS

| | | | | |
|---|---|---|---|---|
| 2003/0190936 | A1* | 10/2003 | Fan ....................... | H02J 7/0044 455/572 |
| 2010/0214074 | A1* | 8/2010 | Twitchell, Jr. ........ | H04W 84/18 340/10.3 |
| 2013/0021175 | A1* | 1/2013 | Harmon ................. | G06Q 10/08 340/990 |
| 2015/0179036 | A1* | 6/2015 | Heine .................... | G06Q 10/08 340/572.1 |
| 2016/0291127 | A1* | 10/2016 | Huang ..................... | G01S 5/10 |
| 2019/0364492 | A1 | 11/2019 | Azizi et al. | |
| 2020/0097786 | A1 | 3/2020 | Skaaksrud | |
| 2020/0294401 | A1 | 9/2020 | Kerecsen | |
| 2022/0245929 | A1* | 8/2022 | Aslandere ............... | H04W 4/38 |

* cited by examiner

*Primary Examiner* — Levi Gannon
(74) *Attorney, Agent, or Firm* — Leydig, Voit & Mayer, Ltd.

(57) ABSTRACT

A system includes one or more assets loaded into and/or removed from a vehicle. Each asset is coupled to a wireless tag, and each wireless tag wirelessly transmits beacon signals at predetermined intervals. The system includes a gateway disposed within the vehicle. The gateway is configured to receive power from a vehicle power source when the vehicle is operating, and the gateway is configured to receive power from an internal battery source when the vehicle is not operating. The gateway is configured to scan an area of the vehicle at a duty cycle to identify beacon signals transmitted by the wireless tags and receive the beacon signals from the wireless tags.

5 Claims, 3 Drawing Sheets

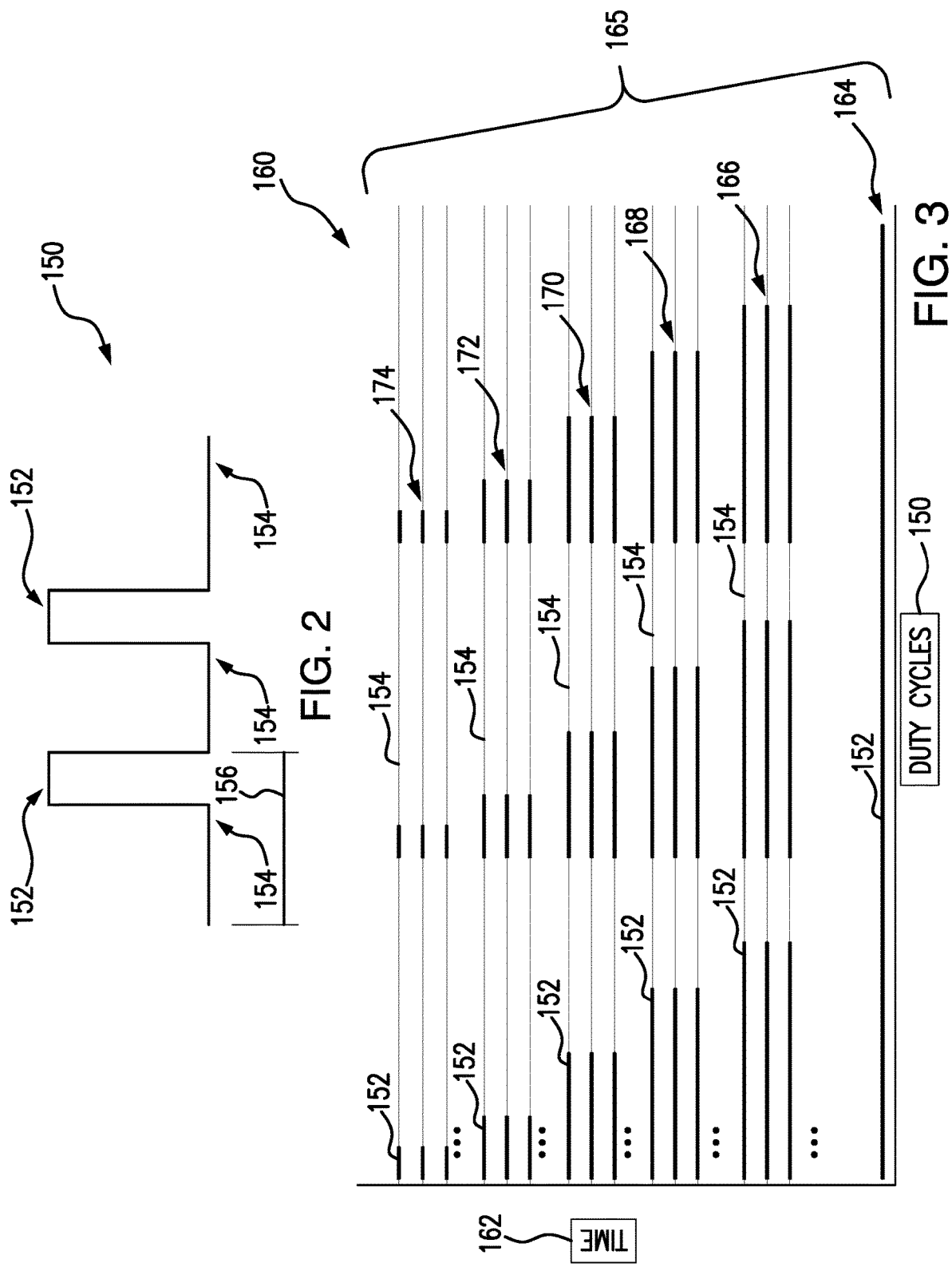

SYSTEMS AND METHODS FOR A LOW POWER MODE IN VEHICLE GATEWAYS

BACKGROUND OF THE INVENTION

The present disclosure relates generally to the field of asset management, and more particularly to systems and methods to switch to a low power mode in a vehicle gateway.

Various assets, such as corded and cordless power tools, may be useful on a typical construction jobsite. These assets may include tools such as drill machines, saws, hammers, grinders and sanders, vacuum cleaners, drivers, measuring tools, and/or other types of tools and tool accessories. Often, assets are moved between locations (e.g., a construction jobsite, a warehouse, a container, etc.) by different groups of people. Assets are typically valuable resources, and it is beneficial to track the status of a particular asset in order to improve the overall efficiency of the jobsite. Accordingly, various systems and methods may be utilized to track the location and/or the real-time status of a particular asset within a fleet of tools owned by a particular entity. In particular, assets may be tracked with tags that periodically beacon information to a remote gateway. One or more gateways may continuously and/or periodically scan for beacon signals from tags within the vicinity, and may send information received from a tag to a remote asset management system. In certain situations, a gateway may utilize large amounts of power in order to function continuously and/or periodically.

Accordingly, it is beneficial to provide for systems and methods for reducing the power consumption of a gateway by adjusting the operation of the gateway based on available power sources.

BRIEF DESCRIPTION OF THE INVENTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes one or more assets loaded into and/or removed from a vehicle. Each asset is coupled to a wireless tag, and each wireless tag wirelessly transmits beacon signals at predetermined intervals. The system includes a gateway disposed within the vehicle. The gateway is configured to receive power from a vehicle power source when the vehicle is operating, and the gateway is configured to receive power from an internal battery source when the vehicle is not operating. The gateway is configured to scan an area of the vehicle at a duty cycle to identify beacon signals transmitted by the wireless tags and receive the beacon signals from the wireless tags.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 2 is a schematic of an embodiment of the gateway of FIG. 1 operating in a low power mode operation, where a duty cycle includes alternating active and inactive periods;

FIG. 3 is a diagram of an embodiment of the gateway of FIG. 1 making an operational adjustment, where the operational adjustment is a stepwise adjustment based on one or more operational parameters;

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1:
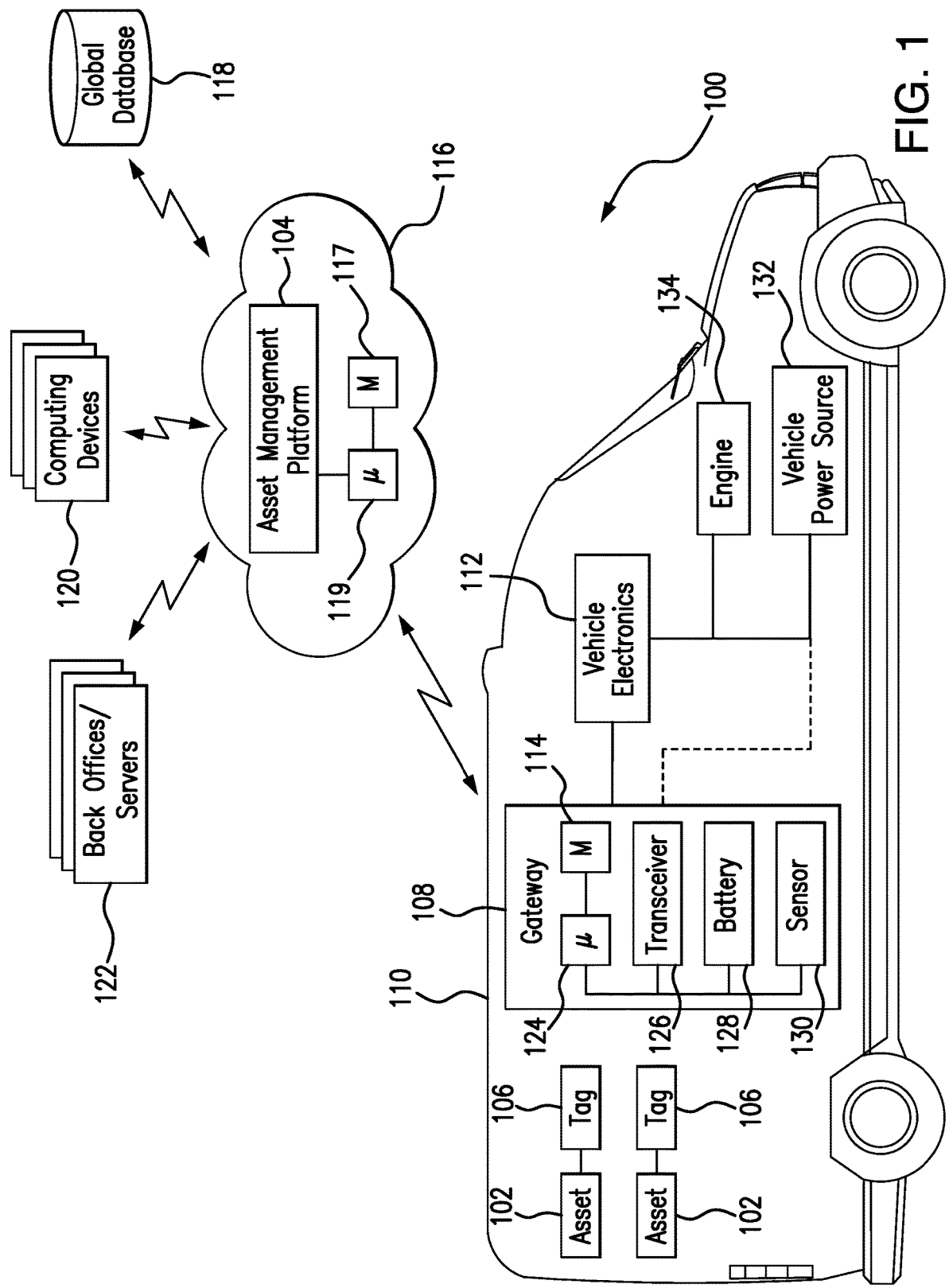
FIG. 1 is a block diagram of an embodiment of an asset management system having a gateway disposed within a vehicle, where the gateway uses an internal power source or an external power source.

Turning now to the drawings, FIG. 1 is an asset management system 100 having a plurality of assets 102 that are tracked with a remote asset management platform 104. Each asset 102 may be removably and communicatively coupled to a wireless tag 106. The wireless tags 106 may be active or passive tags that are configured to wirelessly transmit and receive information to/from a gateway 108. In certain embodiments, the assets 102 and wireless tags 106 may be loaded onto and/or removed from a vehicle 110, and the gateway 108 is a vehicle gateway that is disposed within (and associated with) the vehicle 110. In certain embodiments, the gateway 108 may be fixed or mounted inside the vehicle 110, and communicatively coupled to the vehicle electronics 112. An infrastructure of connected devices (e.g., the gateways 108 and/or other computing devices) may gather data from the wireless tags 106, and wirelessly transmit this information to the asset management platform 104. The asset management platform 104 may be a cloud-based service that collects information from the gateways 108 to track and inventory the assets 102.

The plurality of assets 102 may be owned or managed by a single entity (e.g., a corporation, an individual, an organization, etc.) or by several entities. For example, assets may include tools such as power tools (e.g., rotary hammers, drives, screw drivers, saws, grinders, etc.), drill machines, vacuum cleaners and accessories, measuring tools (e.g., detection tools, lasers, layout tools, surveying equipment, etc.), direct fastening tools, diamond cutting and drilling tools, tool accessories (e.g., tool boxes, kits, computing devices, etc.), and/or other types of tools and tool accessories that may be utilized within the construction industry. While the construction industry is utilized as an exemplary embodiment, it should be noted that the present embodiments may be applicable in other industries. In certain embodiments, assets may include any product, resource, or accessory utilized in an industrial setting that may be a valuable resource owned by the entity. For example, the present embodiments may be utilized to track and inventory assets in the manufacturing, energy, agriculture, transportation and logistics, or services industries. Assets in such industries may include, for example, shipping equipment, machinery, vehicles, telecommunications equipment, hardware, or any resource that may be a valuable asset for an entity.

In certain embodiments, the asset 102 may be removably attached and initially registered/assigned to the wireless tag 106. Wireless tags 106 may be active or passive tags that are configured to wirelessly transmit and receive information to/from a computing device, such as the gateway 108, smartphone, computer, tablet, etc. The association between the wireless tag 106 and the asset 102 may be stored within the remote asset management platform 104. In certain embodiments, the registration and assigning process may be processed by the manufacturer and/or by the entity who acquires the asset. In certain embodiments, the entity may purchase or acquire an asset already attached, registered, and assigned to the wireless tag. The process of registering a tag with a particular asset may be done with any application and computing device that can identify tags and assets. In certain embodiments, tags may be removed and replaced, so that a damaged tag may be replaced, reused on a different asset, or discarded. Additionally, tags may be re-registered with a different asset, and the new association between the tag and the new asset may be stored within the remote asset management platform 104.

In certain embodiments, the tags 106 may be removably attached to an external surface of the assets 102, or they may be attached to an accessory associated with the assets 102, such as a tool case or container. In certain embodiments, the tags 106 may be mechanically attached to the assets 102 via any attachment means (e.g., adhesive, tape, snap-on, magnet features, screws, nails, press-fit feature, etc.). In certain embodiments, the tags 106 may be disposed within a cavity located on an external surface of the assets 102. In certain embodiments, the tags 106 may be disposed within a housing of the asset 102. In particular, the wireless tags 106 may be enabled to transmit and receive information to/from the gateway 108 via one or more different wireless modes of operation, such as, but not limited to, any form of radio waves, Bluetooth, Near Field Communication (NFC), Wifi, ZigBee, LoRa, LoRaWAN, Sigfox, or any wireless transmission. In certain embodiments, the tags 106 may be configured to continuously transmit beacon signals at predetermined intervals of time (e.g., 5 seconds, 10 seconds, 15 seconds, 20 seconds, 1 minute, 5 minutes, 10 minutes, 20 minutes, 1 hour, 2 hours, 3 hours, 5 hours, 1 day, 2 days, or any interval that may be suitable to preserve battery life without compromising asset tracking).

In certain embodiments, the assets 102 and the associated wireless tags 106 that are brought within and/or removed from the proximity of the gateway 108 are tracked and recorded, and this information is transmitted to the asset management platform 104. In certain embodiments, the gateway 108 may be fixed or mounted inside the vehicle 110, and communicatively coupled to the vehicle electronics 112. The gateway 108 may be assigned or preassigned as a logical location within the asset management platform 104. Further, the gateway 108 may be configured to monitor and record the activity of the assets 102 proximate to the gateway 108 by scanning for and receiving beacon signals emitted by the wireless tags 106. For example, as assets 102 are loaded to the vehicle 110, stored or transported within the vehicle 110, and/or removed from the vehicle 110, the wireless tags 106 associated with the assets 102 continue to emit beacon signals. The gateway 108 is configured to receive the beacon signals, record the activity as an event, and store the activity within a memory 114 of the gateway 108. In certain embodiments, the gateway 116 acknowledges the beacon signal with an acknowledgment signal. In certain embodiments, the event may include a time-stamp, operating parameters of the asset 102, status information, unique identification information of the asset and/or battery, state of health (SOH) or state of charge (SOC) of the battery associated with the asset 102, or any other information that may be relevant to the asset or the status of the asset 102.

In certain embodiments, the gateway 108 may be configured to receive and process the beacon signals, and transmit the information to the asset management platform 104, which is a cloud-based computing device 116, via WiFi (e.g., Institute of Electrical and Electronics Engineers [IEEE] 802.11X, cellular conduits (e.g., high speed packet access [HSPA], HSPA+, long term evolution [LTE], WiMax) and the like. In this manner, the gateway 108 may include router capabilities that allow for it to gather, analyze and transmit information to the asset management platform 104. The asset management platform 104 records and analyzes information received from one or more gateways 108 (and/or other computing devices), to provide real-time information about the physical location of a particular asset 102. The asset management platform 104 may be configured to record the event associated with the asset 102 and maintain a historical record of events for the asset 102. Accordingly, the asset management platform 104 may be configured to determine whether the asset 102 has been loaded, unloaded, or transported/stored within the vehicle 110.

The cloud-based computing device 116 may be a service provider providing cloud analytics, cloud-based collaboration and workflow systems, distributed computing systems, expert systems and/or knowledge-based systems. The cloud-based computing device 116 may include a memory 117 and a processor 119. In certain embodiments, the cloud-based computing device 116 may be a data repository that is coupled to an internal or external global database 118. Further, in certain embodiments, the global database 118 may allow computing devices 120 to retrieve information stored within for additional processing or analysis. Indeed, the cloud-based computing device may be accessed by a plurality of systems (computing devices 120 and/or computing devices from back offices/servers 122) from any geographic location, including geographic locations remote from the physical locations of the systems. Accordingly, the cloud 116 may enable advanced collaboration methods between parties in multiple geographic areas, provide multi-party workflows, data gathering, and data analysis, which may increase the efficiency of remotely tracking and keeping an inventory of assets owned by a particular entity in real-time.

In certain embodiments, the gateway 108 may include a processor 124, the memory 114, a transceiver 126, an internal battery 128, and sensors 130. The memory 114 may be configured to store activity and/or events of the assets 102, and may store instructions or logic executable by the processor 124. In certain embodiments, the transceiver 126 may transmit the information to the asset management platform 104 via one or more different wireless protocols, as described in detail above. In certain embodiments, the gateway 108 includes an internal power source (such as an internal battery 128) that is utilized when an external power source (such as a vehicle power source 132) is not available. In certain embodiments, the gateway 108 may receive power directly from a vehicle power source 132, such as a 12V charger port, an OBD port, or a similar direct connection to the vehicle 110. In certain embodiments, the gateway 108 may be connected via the vehicle electronics 112, and may receive power from the vehicle power source 132 (e.g., vehicle battery) when the vehicle engine 134 is turned "ON." When the vehicle engine 134 is turned "OFF," the gateway 108 is disconnected from the vehicle power source 132, and switches to the internal battery 128 (e.g., rechargeable battery) for power. In certain embodiments, when the gateway 106 is coupled to the vehicle power source 132, the gateway 108 may continuously scan for beacon signals from the wireless tags 106. However, when the gateway 108 is utilizing the internal battery 124, continuous scanning may drain the battery and reduce the efficiency or accuracy of gateway scanning. Accordingly, the present embodiments describe systems and methods for operating the gateway 108 in a low power mode based on the power source available, as further described in detail below.

FIG. 2 is a schematic of an embodiment of the gateway 108 of FIG. 1 operating in a low power mode, where a duty cycle 150 of the gateway 108 includes alternating active periods 152 and inactive periods 154. The duty cycle 150 of the gateway 108 may be described as the fraction of time the gateway 108 is actively scanning for beacon signals over the total duration of time the gateway 108 is operational. In other words, the duty cycle 150 is the active period 152 over the total duration 156. The duty cycle 150 may be set based on one or more operational parameters of the gateway 108, such as, for example, the capacity of the internal battery 128 and/or the amount of time the gateway 108 has already been operating in a low power mode, as further described in detail below.

As noted above, in certain embodiments, the gateway 108 may be configured to continuously scan for beacon signals from wireless tags 106 when the gateway 108 receives power from the vehicle power source 132. In other words, when an external power source is available, the gateway 108 may operate in a high duty cycle where the gateway 108 spends more time actively scanning for beacon signals from its vicinity. In certain embodiments, the gateway 108 may be configured to dynamically adjust the duty cycle 150 based on one or more operational parameters. Specifically, the gateway 108 may switch from a high duty cycle (where the gateway 108 is operating in a high power mode and/or continuously scanning for beacon signals) to a low duty cycle (where the gateway 108 is operating in a low power mode and modifies the duty cycle 150 to adjust the duration of the active period 152). For example, in certain embodiments, the gateway 108 may operate in the low power mode by decreasing the active period 152 (e.g., 10 minutes, 9 minutes, 8 minutes, 7 minutes, 6 minutes, 5 minutes, or less) every hour or more that the gateway 108 is operational. In certain embodiments, the gateway 108 may operate in the low power mode by keeping the active period 152 fixed (e.g., 5 mins) and increasing the inactive period 154 (e.g., 0, 5 mins, 10 mins, 20 mins, etc.). As another example, in certain embodiments, the gateway 108 may operate in the high power mode by increasing the active period 152 (e.g., 30 minutes, 40 minutes, 50 minutes, or more) every hour or more than the gateway 108 is operational. In certain embodiments gateway 108 may operate in the high power mode by keeping the active period 152 fixed (e.g., 5 mins) and decreasing the inactive period 154 (e.g., 20 mins, 10 mins, 5 mins, 0 min etc.).

Figure 4:
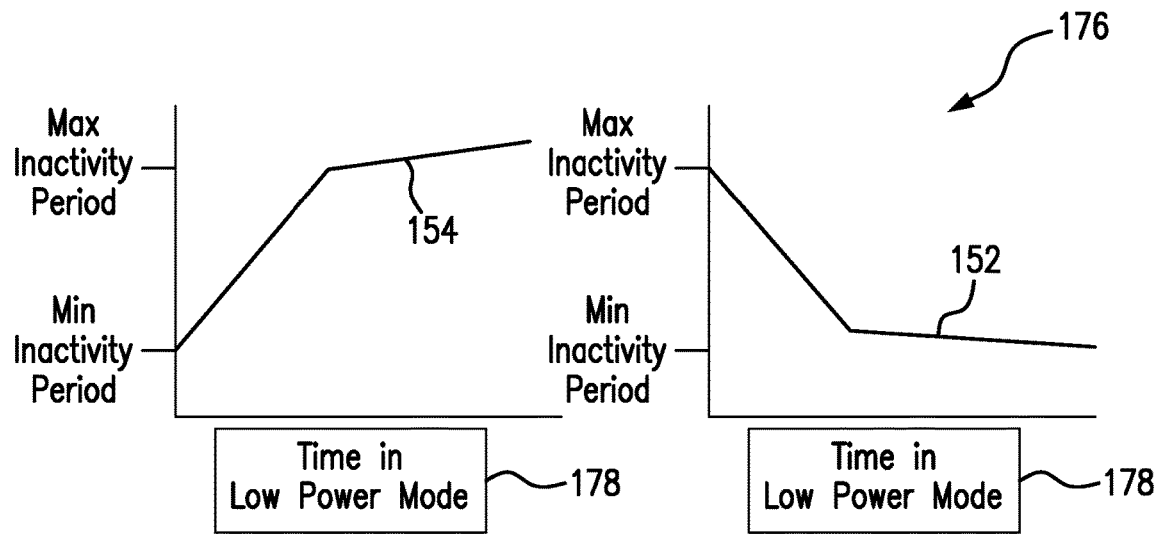
FIG. 4 is a diagram of an embodiment of the gateway of FIG. 1 making an operational adjustment, where the operational adjustment is an exponential adjustment based on one or more operational parameters.
Figure 5:
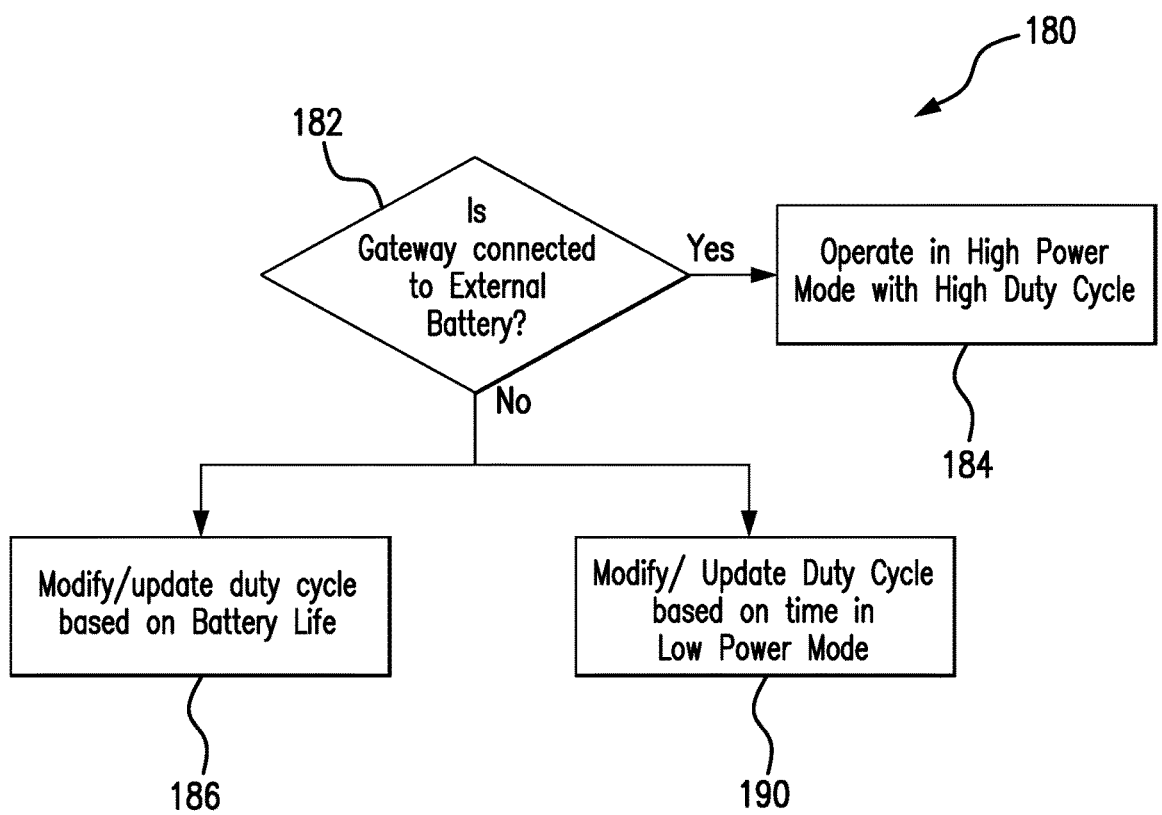
FIG. 5 is a flow chart of an embodiment of the gateway of FIG. 1, where the gateway modifies or updates the duty cycle based on one or more operational parameters.

In particular, the processor 124 may be configured to dynamically adjust the duty cycle 150 based on various operational parameters of the gateway 108, as further described in detail with respect to FIGS. 3-5. Furthermore, the processor 124 may be configured to dynamically adjust the duty cycle 150 with different processes. For example, the duty cycle 150 may be adjusted with a stepwise adjustment, as described in greater detail with respect to FIG. 3 or with an exponential adjustment, as described in greater detail with respect to FIG. 4.

FIG. 3 is a diagram of an embodiment of the gateway 108 of FIG. 1 making an operational adjustment, where the operational adjustment is a stepwise adjustment 160 of the duty cycle 150 based on one or more operational parameters.

As noted above, the duty cycle 150 may be adjusted based on one or more operational parameters of the gateway 108, such as, for example, the remaining capacity of the internal battery 128 and/or the amount of time the gateway 108 has already been operating in a low power mode. For example, in certain embodiments, the gateway 108 may revert to utilizing the internal battery 128 when the external power source (e.g., the vehicle power source 132) is unavailable, such as when the engine is "OFF." Scanning continuously and/or in a high duty cycle when the gateway 108 is utilizing the internal battery 128 may have an undesired impact on the life of the internal battery 128. Accordingly, the duty cycle 150 may be adjusted, or readjusted, based in part on the remaining capacity of the internal battery 128, as further described with respect to FIG. 5. In certain embodiments, the duty cycle 150 may be adjusted, or readjusted, based in part on the amount of time the gateway 108 has been in low power mode, as further described with respect to FIG. 5. For example, in certain situations, the longer the gateway 108 is in a low power mode, the greater the impact on the internal battery 128. Accordingly, the duty cycle 150 may be dynamically adjusted, or readjusted, throughout the duration of time the gateway 108 is in low power mode.

In certain embodiments, the gateway 108 may be adjusted based on the stepwise adjustment 160. The stepwise adjustment 160 is a gradual increase or decrease of the active period 152 and/or the inactive period 154 over a duration of time 162. As an example, when the gateway 108 in operating in a high power mode or a high duty cycle 164 (e.g., the gateway 108 is receiving power from the vehicle power source 132), the gateway 108 is continuously scanning for beacon signals from the wireless tags 106, and the gateway 108 is continuously in the active period 152. In certain embodiments, based on various operational parameters, the gateway 108 may gradually adjust from the high duty cycle 164 to lower duty cycles 165. In certain embodiments, the gateway 108 may adjust from the higher duty cycle 164 to lower duty cycles 165 by gradually decreasing the duration of the active period 152 or increasing the duration of the inactive period 154 over the duration of time 162. For example, at a first low duty cycle 166, the gateway 108 may set the activity period to 50 minutes and the inactivity period to 10 minutes. At a second duty cycle 168, the gateway 108 may set the activity period to 40 minutes and the inactivity period to 20 minutes. At a third duty cycle 170, the gateway 108 may set the activity period to 30 minutes and the inactivity period to 30 minutes. At a fourth duty cycle 172, the gateway 108 may set the activity period to 20 minutes and the inactivity period to 40 minutes. At a fifth duty cycle 174, the gateway 108 may set the activity period to 10 minutes and the inactivity period to 40 minutes. It should be noted that while both the activity period 152 and the inactivity periods 154 may be modified in certain embodiments, the gateway 108 may have a fixed inactivity period 154 and only modify the active period 152 (or vise versa).

In certain embodiments, the gateway 108 may include predetermined limits for the activity period 152 and/or the inactivity period 154 in order to maintain a predetermined level of accuracy within the asset management platform 104. For example, the asset management platform 104 may indicate that the inactivity period 154 must not be greater than 60 minutes, so that the assets 102 are tracked with a status update every 60 minutes. In certain embodiments, the asset management platform 104 may specify an accuracy percentage as an operational requirement, so that a minimum standard is maintained for gateways 108 gathering and transmitting information. For example, the asset management platform 104 may specify that the activity period 152 must not be less than 20 minutes, in order to provide the gateway 108 with enough time to scan all the wireless tags 106 within its proximity. As a further example, the accuracy percentage may be set to 98%, which means that given one hundred assets within the vicinity of the gateway 108 over a 60 minute activity period 152, ninety eight assets 102 may be reported to the gateway 108 within one duty cycle. Accordingly, the asset management platform 104 may indicate operational requirements, such as predetermined limits for activity periods 152 and/or inactivity periods 154 and a percentage of accuracy.

In certain embodiments, the gateway 108 may calculate the number of steps that may be needed to gradually increase or decrease the duty cycles 150. The gateway 108 may calculate the steps based in part on the amount and length of power interruptions allowed before the real-time performance of the gateway 108 is impacted.

FIG. 4 is a diagram of an embodiment of the gateway 108 of FIG. 1 making an operational adjustment, where the operational adjustment is a linear adjustment 176 of the duty cycle 150 based on one or more operational parameters.

In certain embodiments, the gateway 108 may linearly adjust activity period 152 and inactivity time 154. The linear adjustment 176 is a linear decrease of the duty cycle based on the time that the gateway 108 has spent within a low power mode 178 having lower duty cycles 165. For example, as the time that the gateway 108 has spent in the low power mode 178 increases, the gateway 108 may adjust the duty cycle 150 to linearly increase the inactivity period 154 from minimum to maximum desired levels. As a further example, as the time that the gateway 108 has spent in the low power mode 178 increases, the gateway 108 may adjust the duty cycle 150 to linearly decrease the activity period 152 from maximum to minimum desired levels.

In certain embodiments, the gateway 108 may adjust duty cycle 150 by exponentially decreasing activity period 152 and/or exponentially increasing inactivity period 154.

As noted above, the duty cycle 150 may be adjusted based on one or more operational parameters of the gateway 108, such as, for example, the remaining capacity of the internal battery 128 and/or the amount of time the gateway 108 has already been operating in a low power mode. In certain embodiments, the gateway 108 may adjust duty cycle 150 by decreasing activity period 152 and/or inactivity period 154 according to any function of time or remaining capacity of the internal battery.

FIG. 5 is a flow chart 180 of an embodiment of the gateway 108 of FIG. 1, where the gateway 108 modifies or updates the duty cycle 150 based on one or more operational parameters. As noted above, the duty cycle 150 may be adjusted based on one or more operational parameters of the gateway 108, such as, for example, the remaining capacity of the internal battery 128 and/or the amount of time the gateway 108 has already been operating in a low power mode.

In certain embodiments, the method 180 includes determining if the gateway 108 is connected to an external power source, such as the vehicle power source 132 (block 182). If the gateway 108 is connected to the vehicle power source 132, the gateway 108 may be configured to operate in a high power mode with a high duty cycle 164 (block 184). If the gateway 108 is not connected to the vehicle power source 132, and is utilizing the internal battery 128, the gateway 108 may be configured to modify, adjust, or readjust the duty cycle 150 from the high duty cycle 164 to lower duty cycles 165.

In certain embodiments, the gateway 108 may be configured to adjust or readjust the duty cycle 150 based in part on the remaining battery life of the internal battery 128 (block 186) or based on the time in low power mode (block 190). For example, for a vehicle 110 that is parked over a weekend (e.g., the engine 134 is "OFF"), the gateway 108 continues to function in a low power mode over the weekend, thereby slowing draining the internal battery 128. The gateway 108 may be configured to adjust the duty cycle 150 with either the stepwise adjustment 160 (such as when the vehicle remains parked over the weekend) or with the exponential adjustment 170 (such as when the vehicle is turned "ON" and the internal battery is recharged to normal levels).

In certain embodiments, when the gateway 108 first enters the lower duty cycles 165, the gateway 108 may take into account the percentage of battery life remaining. For example, based on a calculated battery life, the gateway 108 may immediately enter a lower duty cycle 172, 174 rather than a duty cycle 166, 168 that is not as low. In certain embodiments, the remaining battery life may be calculated based on a voltage method, Coulomb Counting, or any other known method for calculating the remaining battery capacity of the internal battery 128. Based on the value of the battery life (e.g., voltage or percentage), the gateway 108 may have a determined duty cycle 150 to implement. For example, if the remaining battery life is 50%, the gateway 108 may set a duty cycle of 50%, such that the activity period 152 and the inactivity period 154 are, for example, 30 minutes each.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed:

1. A system, comprising:

one or more assets loaded into and/or removed from a vehicle, wherein each asset is coupled to a wireless tag, and wherein each wireless tag is configured to wirelessly transmit beacon signals at predetermined intervals; and a gateway disposed within the vehicle, wherein the gateway is configured to receive power from a vehicle power source when the vehicle is operating, and wherein the gateway is configured to receive power from an internal power source when the vehicle is not operating, and wherein the gateway is configured to:

scan at a high duty cycle when the gateway is receiving power from the vehicle power source, and to scan at a low duty cycle when the gateway is receiving power from the internal power source;

scan an area of the vehicle at a duty cycle to identify beacon signals transmitted by the wireless tags; and receive the beacon signals from the wireless tags.

2. The system of claim 1, wherein the gateway is configured to transition between the high duty cycle to the low duty cycle based in part on the available power source.

3. The system of claim 1, wherein the duty cycle is a period of time the gateway is actively scanning for the beacon signals over a total time.

4. The system of claim 3, wherein the duty cycle comprises alternating active periods and inactive periods, and wherein the gateway is scanning for the beacon signals during the active period, and wherein the gateway is not scanning for the beacon signals during the inactive period.

5. The system of claim 1, wherein the internal power source is a rechargeable battery.

* * * * *